United States Patent [19]

Lien

[11] Patent Number: 5,477,813
[45] Date of Patent: Dec. 26, 1995

[54] PLANT FOR FARMING FISH AND SHELLFISH

[75] Inventor: Egil Lien, Saupstad, Norway

[73] Assignee: Sinvent A/S, Trondheim, Norway

[21] Appl. No.: 204,356

[22] PCT Filed: Sep. 11, 1992

[86] PCT No.: PCT/NO92/00150

§ 371 Date: Jun. 10, 1994

§ 102(e) Date: Jun. 10, 1994

[87] PCT Pub. No.: WO93/04576

PCT Pub. Date: Mar. 18, 1993

[30] Foreign Application Priority Data

Sep. 11, 1991 [NO] Norway .................... 913581

[51] Int. Cl.⁶ .................... A01K 97/20; A01K 63/00
[52] U.S. Cl. .................... 119/223; 119/240
[58] Field of Search .................... 119/223, 208, 119/217, 240, 239, 248, 224, 225

[56] References Cited

U.S. PATENT DOCUMENTS

| | | | |
|---|---|---|---|
| 4,140,079 | 2/1979 | Fruchtnicht | 119/225 |
| 4,147,130 | 4/1979 | Goguel | 119/223 |
| 4,170,196 | 10/1979 | Yoneya | 119/223 |
| 4,297,973 | 11/1981 | Knowles | 119/225 |
| 4,744,331 | 5/1988 | Whiffin | 119/223 |
| 4,957,064 | 9/1990 | Koma | 119/3 |

FOREIGN PATENT DOCUMENTS

| | | | |
|---|---|---|---|
| 153991 | 3/1986 | Norway | A01K 61/00 |
| 587915 | 1/1978 | U.S.S.R. | 119/223 |
| 1489673 | 6/1989 | U.S.S.R. | 119/223 |
| NO89/00010 | 8/1989 | WIPO | A01K 61/00 |
| 8906902 | 8/1989 | WIPO | 119/223 |

Primary Examiner—Todd E. Manahan
Attorney, Agent, or Firm—Christensen, O'Connor, Johnson & Kindness

[57] ABSTRACT

The invention provides a plant for the storage of fish and shellfish that includes a net cage for submerging in a body of water. The cage includes a floor section, surrounding walls with bottom ends thereof attached to a perimeter of the floor section, and an upper roof section of netting with bottom ends thereof attached to top ends of the walls. The roof conforms to a frustoconical shape when in use and includes a central buoyant member in an upper end thereof. In use, the roof extends slackly from the central buoyant member to the points of attachment at the surrounding walls. The surrounding walls are vertically supported by a plurality of buoyant bodies attached to the upper edge of the walls. The entire cage is supported in water by a support section supplied with a buoyant element. The support section is, in turn, held in place by an anchoring section that includes a plurality of substantially parallel vertical cables that are anchored to bottom. Because the anchoring cables are vertical, the plant is able to move laterally, and downwardly, under forces of strong wind, wave, or current action and thereby become completely submerged to protect the plant, and enclosed fish, from the elements.

8 Claims, 5 Drawing Sheets

PLANT FOR FARMING FISH AND SHELLFISH

STATEMENT OF RELATED APPLICATION

This application claims priority from Norwegian application No. 91.3581 filed on Sept. 11, 1991, and is a national phase application of PCT/NO92/00150 filed Sept. 11, 1992.

BACKGROUND

The present invention relates to a plant for breeding, farming and storage of fish and other marine species of the kind comprising a net cage which is installed in a submerged position in the sea. The invention is particularly adapted for installation in open or offshore environments as distinct from sheltered and shallow environments.

Fish farming plants of this kind consist basically of a plurality of anchored floating bodies which support a net cage downwardly suspended in the sea. In order to stabilize the net cage in a substantially vertically expanded configuration in the sea, weights and/or bottom anchorings are arranged along the bottom edge of the net cage. In connection with fish farming plants to be installed in sheltered waters, these are often equipped with suitable platforms supplied with gangways, and suspended fish feeding means.

Known plants for farming and storing or caging fish in the sea have, on account of their shape and equipment, a limited field of utilization due to the prevailing environmental forces, water depths etc. The installation site of the plants creates problems such as a risk for local contamination and traffic impediments. Consequently, both fish farmers and authorities want to develop plants which can be positioned in more open, deep water areas. Location of the plants in open deep waters will also render possibilities for installation of larger plants.

In recent years, several types of fish farming plants have been developed, designed for use in offshore environments. As illustrative for the prior art in this field reference made be made to U.S. Pat. No. 4,957,064, Swedish Patent No. 450866 and Norwegian Patent No. 153991.

The U.S. patent shows a fish cage structure consisting of a cagelike enclosure which is provided with circumferentially arranged float means at the top, designed to float in the sea surface. The net cage is upwardly open and must accordingly not be pulled down below the sea surface, otherwise the fish would escape. Along the bottom edge of the fish cage, weights are provided in order to tension the cage downwards. Instead of weights, the bottom edge of the cage may be provided with anchor lines to the sea bottom. On account of the interconnected, complicated floating system shown, the plant will be severely exposed to lateral forces from wind and waves.

Swedish patent no. 450866 shows a fish farming plant where the net cage consists of a lattice framework assembled from rods which are linked together in the nodes. The framework circumscribes and supports a net cage with a closed ceiling. The plant is designed for use in open waters, i.e. an "offshore" fish farming plant. The plant seems to imply two substantial drawbacks. Firstly, such a relatively tight or compact construction of the plant will be severely affected by lateral forces, i.e. environmental forces from waves, wind, stream etc. Furthermore, maintenance of the plant will be complicated, since the cage is permanently attached to the framework at a plurality of circumferentially distributed points. Growth or fouling might also represent a problem.

Norwegian patent 153991 shows a plant where a submerged cage is used, i.e. a cage which is normally positioned below the sea surface. At the installation site, the cage is pulled down to the selected level. At the top, the cage is provided with ventilation and illumination equipment. A plant with a permanently submerged fish cage will require special air supply means if the plant is to be used for breeding or farming fish belonging to the salmon family.

SUMMARY OF THE INVENTION

The main object of the present invention is to create a new design for a fish farming plant with a special view to a construction which is suitable for installation and use in deeper and more exposed or offshore environments.

A special object in this connection is to provide a farming plant which is little influenced by or vulnerable to lateral environmental forces, such as wind, waves and stream.

A further object for the invention is to provide a farming plant which is reasonable in production, maintenance and operation.

A further object for the invention is to provide a farming plant which is designed so that it can advantageously be used at great depths, for instance depths exceeding several hundred meters.

A still further object of the invention is to provide a plant for fish farming which is applicable for breeding various kinds of fish, such as round fish and also flatfish (flounder) and other marine species, such as shellfish.

The plant for farming and caging or storing fish and the like in accordance with the invention, is of the kind comprising a net or net cage which is anchored to the sea bottom and provided with necessary floats, buoyant members and the like, so that the net cage can be maintained in a sufficiently expanded, vertical position in the sea. The plant in accordance with the invention is generally characterized in that it consists of two main parts, namely an anchoring section with a submerged supporting section or the like with positive buoyancy and which is anchored to the sea bottom with a plurality of preferably parallel lines which lead down to a sea bottom anchor; and a second section which consists of a net cage releasably attached to the supporting section, the net cage having an upper edge provided with circumferentially distributed floating members. The second section has a preferably centrally positioned buoyant body, and the anchoring section and the net cage with the buoyant body are so vertically dimensioned that the central buoyant body on the net cage will normally be positioned substantially at the sea surface. When subjected to environmental forces, such as waves, wind and current, the buoyant body will be pulled or pushed laterally so that the net cage attains from time to time a completely submerged position.

The net cage is preferably made in two parts, namely a lower, substantially cylindrically shaped part which along the top edge or fence is provided with float or buoyant members, and an upper, suitably substantially conically configurated section, the lower edge of which is attached to the top edge of the lower part. A ring-shaped buoyant member, which forms a "water mirror", is located in the uppermost central portion of the upper conical section. Such a configuration of the net cage gives rise to several advantages. Thus, the configuration facilitates the hoisting and removal of growths and fouling from the net cage which normally occurs mostly in the uppermost conical part of the net cage. Furthermore, this geometrical configuration of the net cage, with an upper conical part, imparts a desirable accordion-like vertical flexibility to the net when subjected to wave action so that the cage will only be exposed to weather, wind and current to a limited extent.

A fish farming plant in accordance with the invention will in itself have a rather simple construction, and will be reasonably easy to produce.

The anchoring of the plant with the use of a special anchoring module implies that the plant may be anchored at depths of several hundred meters, a fact which to a large extent increases the field of application.

In periods of bad weather with waves and wind, the plant will be forced laterally and attain an entirely submerged position, in which it is not exposed to those extreme dynamic loads which occur at the sea surface.

The net cage has in itself a very simple construction without large surfaces being exposed to environmental forces.

In view of the fact that the net cage is releasably attached to the anchoring module and may be hoisted up to the sea surface, maintenance and replacements are simple.

BRIEF DESCRIPTION OF THE DRAWINGS

Embodiments for the invention shall be further described with reference to the enclosed drawings, wherein.

DETAILED DESCRIPTION OF THE PREFERRED EMBODIMENTS

Figure 1:
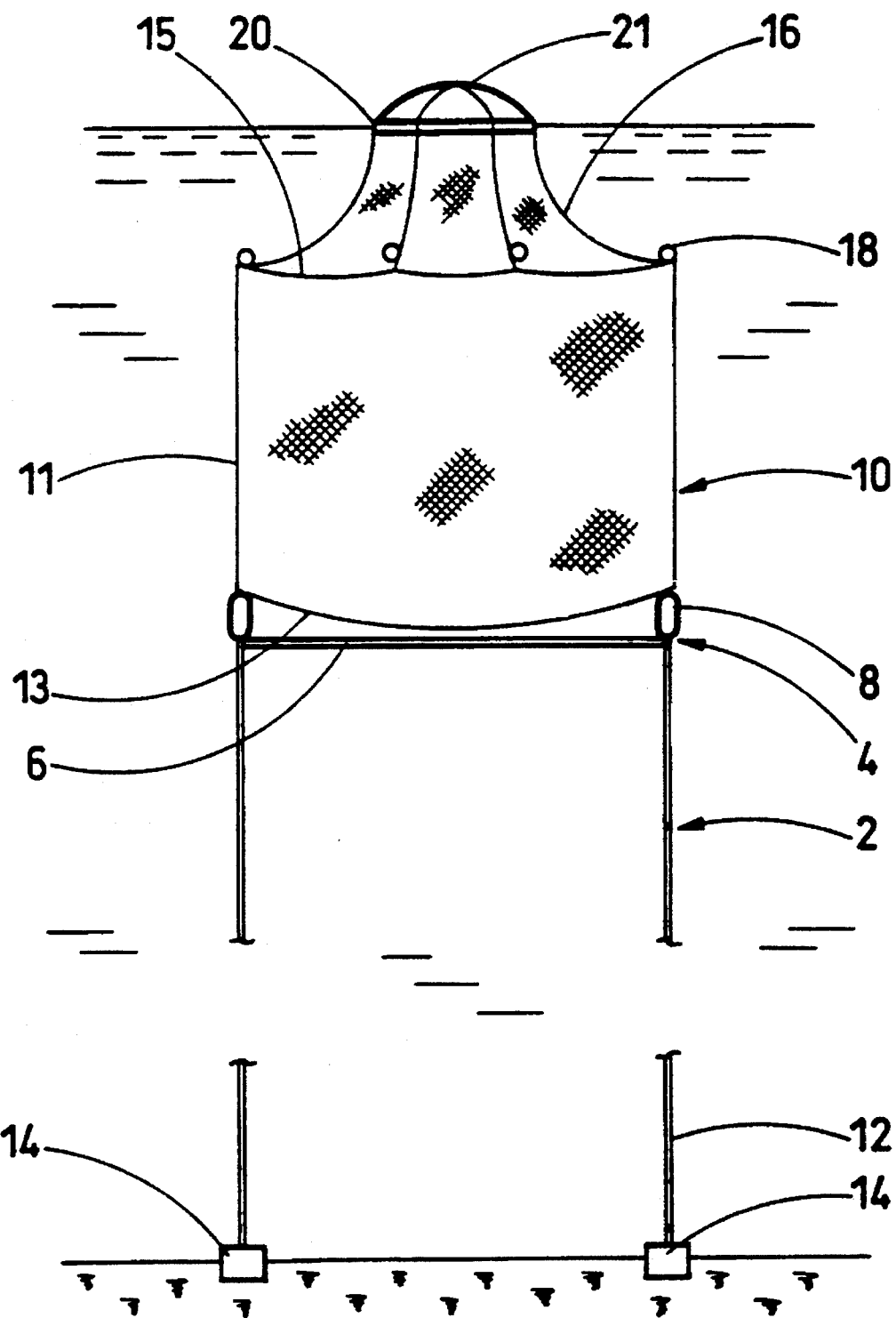
FIG. 1 is a schematic, lateral view of a fully installed plant in accordance with the invention, FIGS. 2a, b and c are detail views illustrating a means for releasing and hoisting of the net cage.

As illustrated in FIG. 1, a fish farm in accordance with the invention consists of an anchoring section 2, comprising a support section 4 which in the shown embodiment consists of a ringshaped element 6 with positive buoyancy or provided with separate buoyant elements 8. The support section 4 is given horizontal dimensions and shape, substantially corresponding to the bottom area or floor 13 of the net cage 10. The support section 4 is anchored to the sea bottom by means of a plurality of preferably substantially parallel stays or lines 12, each of which is connected down to bottom anchors 14. The support section is provided with sufficient buoyancy to support the anchor stays 12 under tension, thereby stabilizing the system in horizontal direction, so that the support section is supported in a preselected, substantially horizontal position in the sea. The rigidity of the system in horizontal direction may be varied by varying the buoyancy of the support section 4 and the buoyant elements 8.

To the support section 4 is releasably attached to the net cage 10, which in plan view may be circular or for instance squarely shaped, having sidewalls 11, a bottom floor 13, and an upwardly tapered top section 16. The net cage 10 is at the uppermost edge 15 provided with circumferentially distributed floating members 18. The top section 16 is uppermost provided with a ringshaped buoyant body 20 adapted to rest and float on the sea surface. On top of the ringshaped buoyant body 20 is suitably mounted a dome-shaped screen 21. The buoyant body 20 will normally rest on the sea surface and thereby form a centrally located "water mirror". The dome-shaped screen prevents birds, seals and the like from entering into the net cage and also prevents the fish from escaping.

A plant in accordance with the invention is suitably given such vertical dimensions, among other things by adjusting the length or height of the anchoring stays relative to the sea depth, that the upper central buoyant body 20 attached to the top part of the top section 16 is floating on the sea surface and forming a water mirror, simultaneously as the upper part 16 of the net cage is slackly suspended (as shown) from the buoyant body 20 down to the buoyant members of the net cage. Vertical flexibility of the buoyant system is thereby achieved so that it is able to absorb minor or normal wave actions and tidal changes. In situations with larger wave actions some of the floating members 18 will be pushed towards the center of the plant and thereby provide geometrical flexibility when the buoyant body 20 moves upwards under wave action. Thereby undesirable jerks against the cage net and the buoyant members are avoided.

Due to the materials of construction of the net cage and the dimensions of the upper part of the net cage, above the floating members 18, this upper part or roof section is normally slackly suspended, like a skirt, from its attachment to the buoyant body 20 at the sea surface, and extends downward to its attachment to the uppermost edge 15 of the surrounding walls 11. This slackness, or lack of tension, in the net of the uppermost section 16 allows the net cage to absorb tidal water level variations including normal sized waves, without risk of the buoyant body 20 being pulled below the water surface and completely submerging the net cage.

Figure 2A:
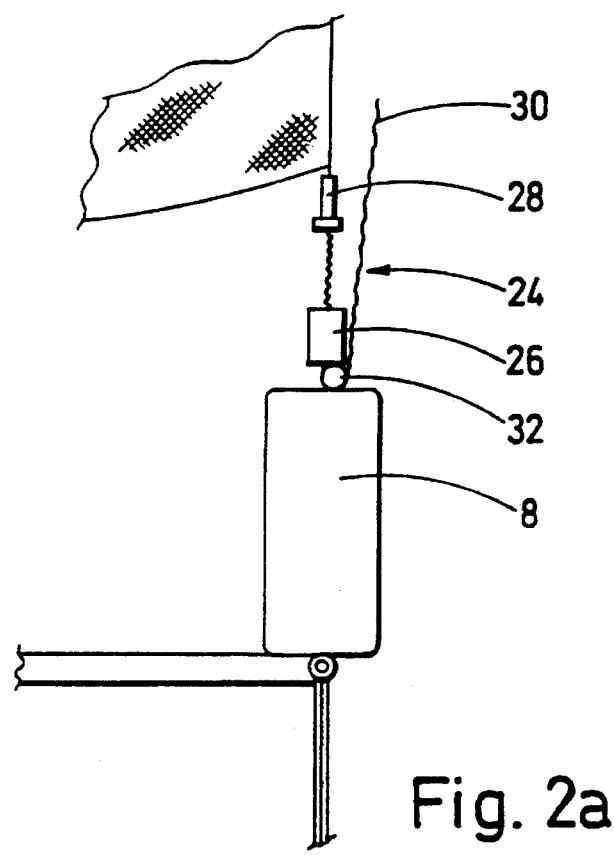
Figures 2B, 2C:
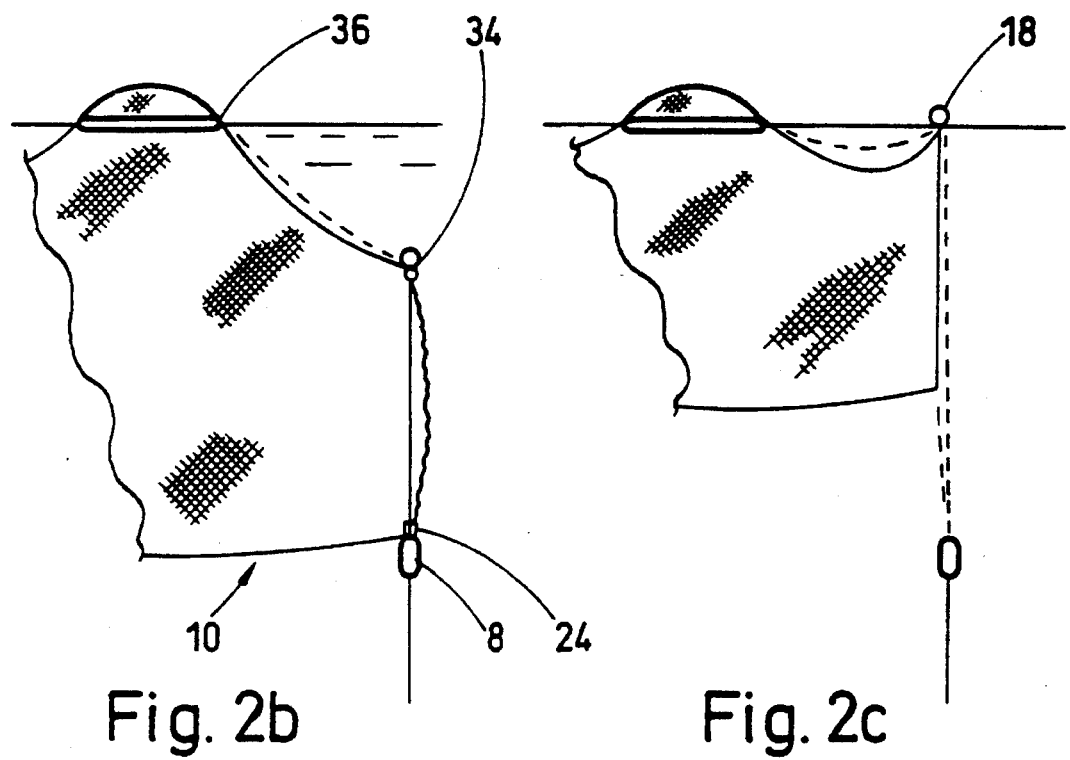

FIG. 2a, b and c are detail views illustrating a means facilitating release and hoisting up of the net cage to desired elevational level. On the support member for the anchoring module or on the buoyant elements 8 are mounted a suitable number of circumferentially distributed quick couplings, each comprising a snap lock 24, having a bushing 26 and a locking pin 28, to which is attached a hoisting line 30 passing down through the bushing to a sheave or block 32, and from there up to a slide ring 34 or the like at the top edge of the net cage, and from there extending to an attachment point 36 on the floating members 18 or the buoyant body 20. The snap lock may suitably be so devised that at one single downward pushing of the pin, the same is locked, and by a renewed second downward pushing on the pin, the locking pin will be released. By operating a quick coupling like this, the net cage can be released from a sea surface position by means of the hoisting line without requiring assistance from a diver. When the net cage is released, the same can be hoisted up, for instance by utilizing a winch mounted on a vessel (not shown). In practical operation, it may frequently be desirable to hoist the net cage up to a position such that the floating members 18 are resting on the sea surface, such as illustrated in FIG. 2c, for instance in order to remove or clean the uppermost part, the top section of the net cage, of floating debris, seaweed, fouling and the like. A hoisting up or raising of the net cage may otherwise take place without use of a winch, since when the hoisting line is released at its uppermost position, the top edge 15 of the net cage will elevate to the sea surface by means of the floating members 18. If the net cage must be replaced, the same is hoisted up, the bottom of the net cage is released from the hoisting line by means of the locking mechanisms which are arranged at suitable spacings around the bottom of the net cage, thereafter a new net cage is installed. When a new net cage is attached on the pins in the locking mechanisms, the net cage is pulled down by attaching the hoisting line to a winch mounted on a nearby vessel.

Figure 3:
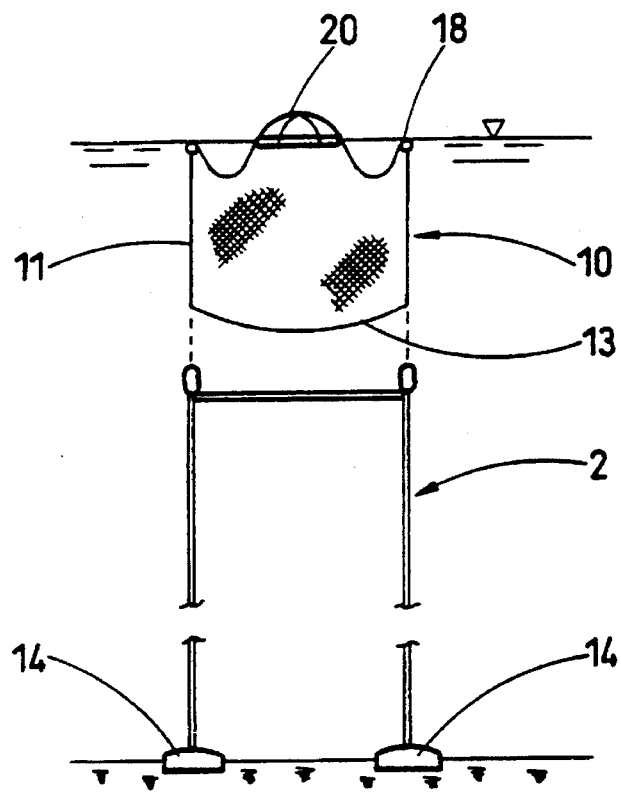
FIG. 3 is a schematic, fragmentary view illustrating the net cage in a partly elevated position.

FIG. 3 is a schematic lateral view, illustrating the net cage in a partly elevated position, so that the floating members 18 are positioned in the sea surface, for instance in order to cleanse the upper conical part of the net cage, as mentioned previously.

Figure 4:
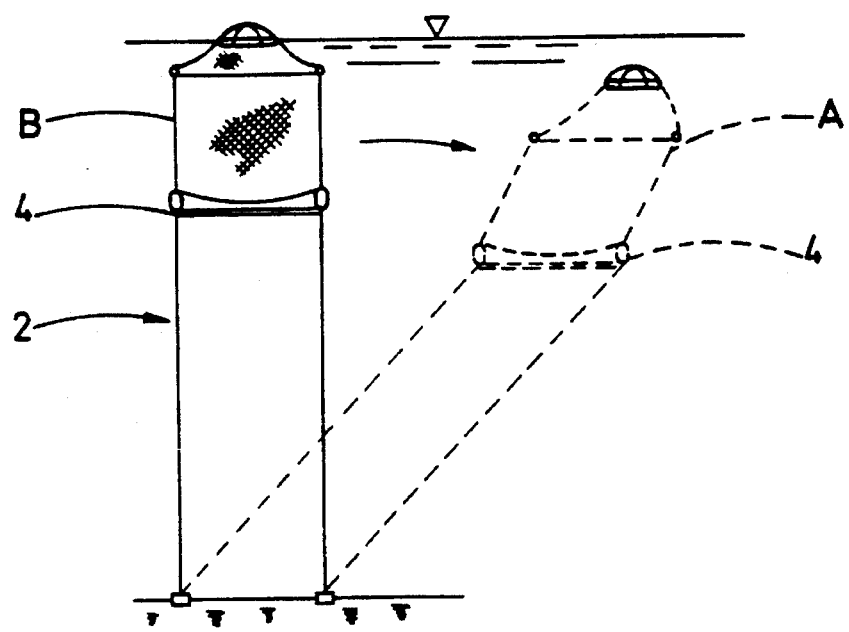
FIG. 4 is a schematic, lateral view illustrating the plant in an extreme laterally displaced position as a result of prevailing environmental forces.

FIG. 4 is a similar schematic lateral view of the entire fish farming plant in two different modes of operation. In the position or mode "A" shown to the right, the plant has attained a laterally displaced position due to lateral forces created by strong wind and current. Due to the structural design of the plant, the support section 4 including the bottom of the net cage is being kept in a substantially horizontal position, even in the shown laterally displaced position. The net cage will, however, be physically laterally displaced relative to the anchoring, and the same situation will also apply to a large extend to the top section of the net cage. This is an advantage, because the dynamic loads on the net cage is reduced. The conically shaped top section of the net cage will further result in a reduction of prevailing dynamic lateral forces on the entire plant, both during normal and during extreme weather conditions, a fact which reduces the loads on the anchoring and also the combined loads on the net cage as well as on the anchoring module. The mode B shown to the left in FIG. 4 illustrates the fish farming plant during fair weather conditions with little or no current.

It will be understood that a fish farming plant in accordance with the invention will be particularly applicable in relatively large sea depths, since at large sea depths, a given deviation angle, given as a function of buoyancy and horizontal forces, results in a larger downward movement of the net cage. This makes it possible for the net cage to be pulled down to a submerged position relatively easily. This provides an advantage, since fish will instinctively seek towards deeper waters during bad weather conditions, and will be more comfortable in a submerged net cage subjected to such conditions.

The uppermost section of the net cage, the so-called top section, which preferably is conically shaped as shown, and the dome-shaped buoyant body at the top, constitute an important functional part in the plant, since this particular configuration implies, as previously mentioned, that the upper part of the net cage when subjected to normal wave actions will fluctuate up and down in the sea simultaneously as the ringshaped floating member rest on the sea surface to provide a water mirror in the net cage, which is necessary in connection with farming of fish such as salmon fish which need to swim up to the surface in order to snatch air for its swimming bladder. A submersion of limited time due to bad weather has, however, little or no influence on the health condition of the fish, and as mentioned, fish will normally seek down to deeper waters in bad weather.

Regarding the top section or conical part of the net cage, this part may with advantage be releasably attached to the top edge of the cylindrical part of the net cage, so that the same may be replaced for cleansing. During such an operation, the floating members 18 will prevent the fish from escaping.

Figure 5:
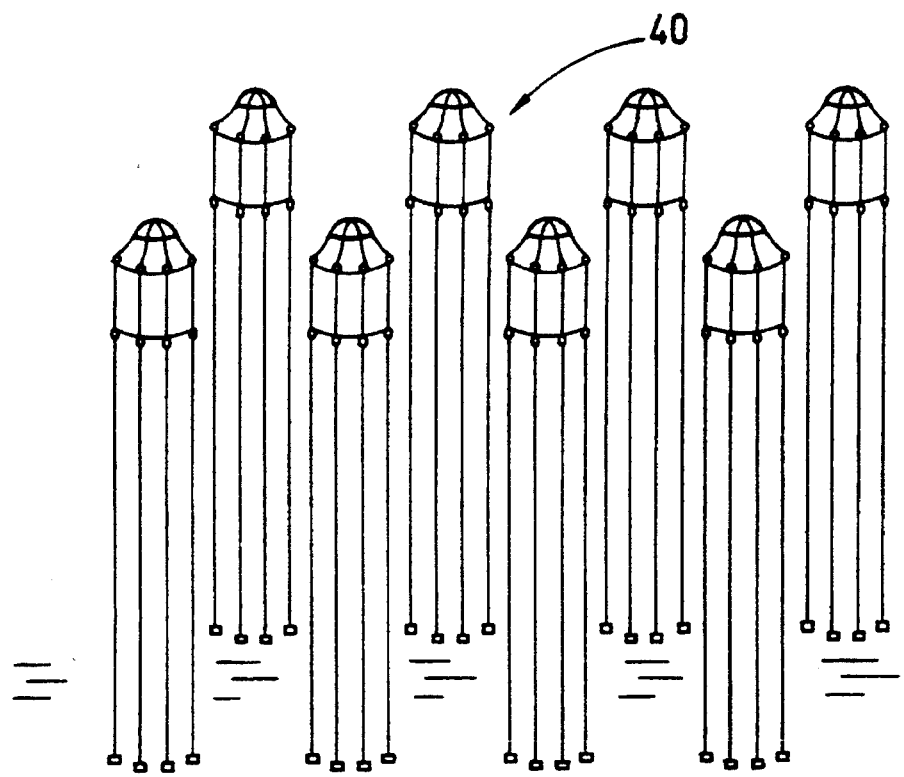
FIG. 5 is a schematic, lateral view of a group of independent fish farming plants in accordance with the invention.

FIG. 5 is a schematic perspective view, illustrating a group of fish farming plants 40, 40 etc. in accordance with the invention, placed side by side.

Figure 6:
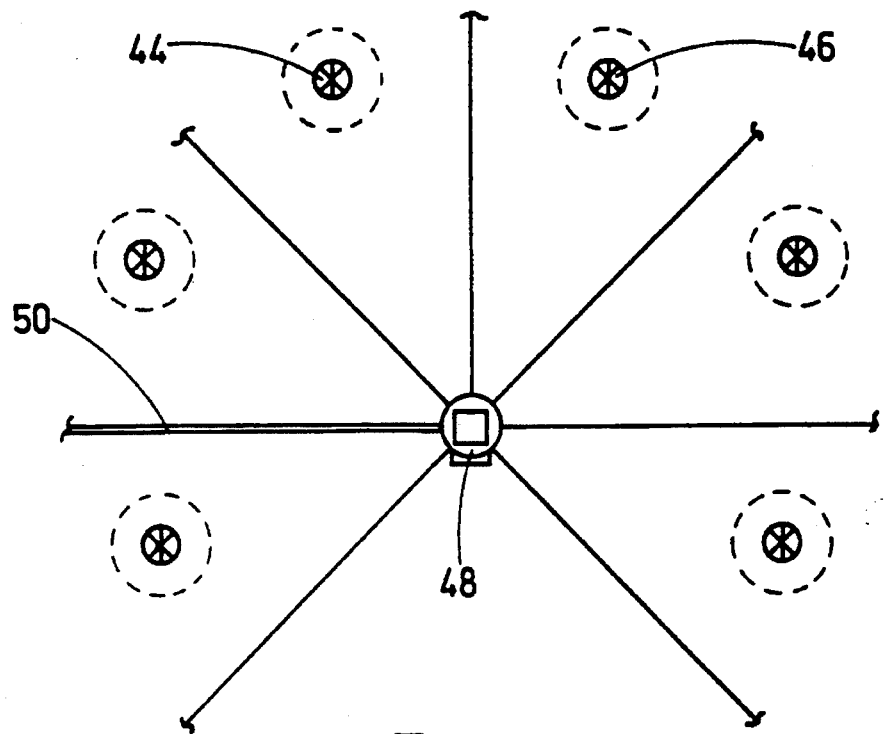
FIG. 6 is a plan view illustrating a further group-wise solution for fish farming plants in accordance with the invention, and FIG. 7a and b illustrate a further embodiment of a fish farming plant in accordance with the invention, wherein the net cage is provided with a plurality of elevationally spaced floors with throughgoing apertures, which embodiment is especially adapted for housing bottom seeking fish species, such as flounder.

FIG. 6 illustrates a further arrangement, where a number of plants 44, 46 etc. are positioned around a central working platform 48 or the like. Such a working platform may, during quiet weather conditions, be moved sideways close to each separate net cage by winching the platform towards the net cages by means of the anchoring lines 50. In connection with conventionally interconnected net cages (distributed anchoring), such an operation will be impossible due to crossing lines.

Figure 7A:
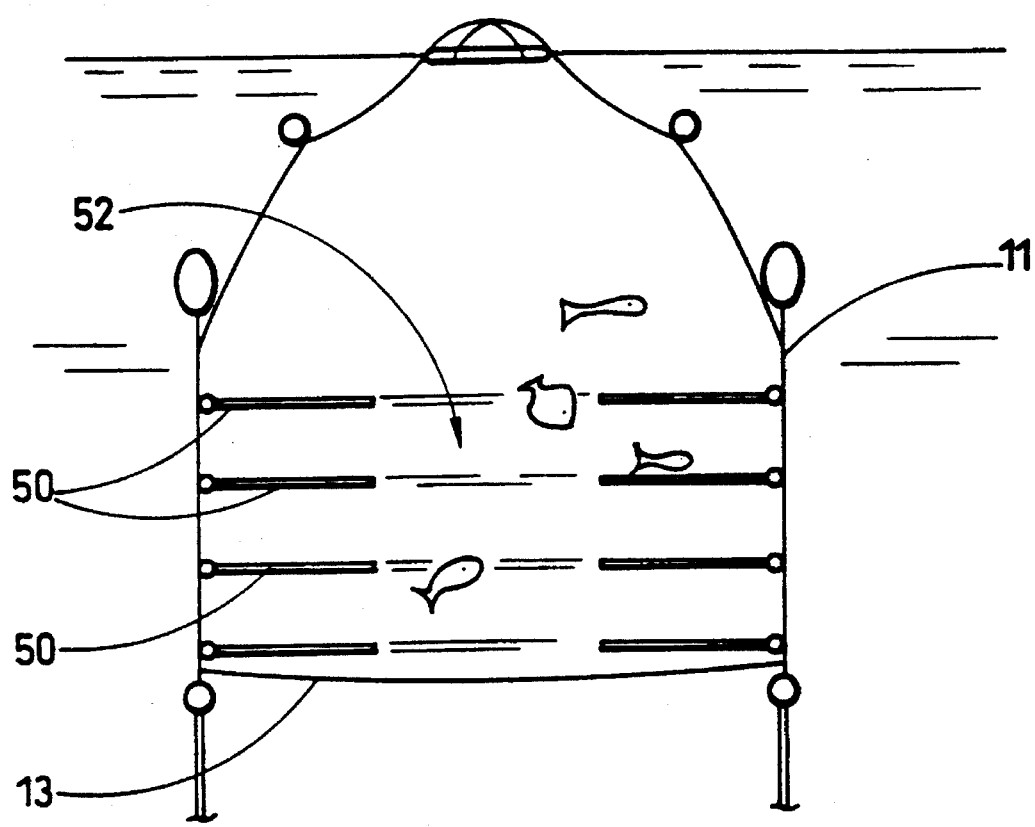
Figure 7B:
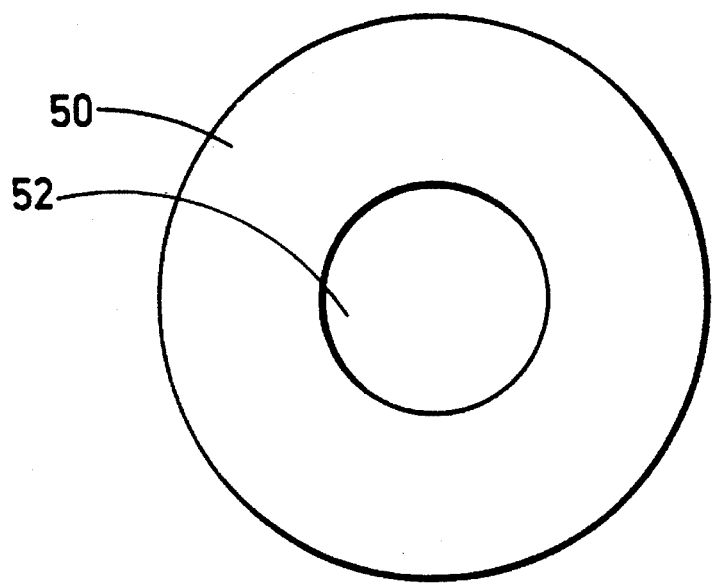

FIG. 7a and b illustrate a further embodiment of a net cage configuration used in a fish farm in accordance with the invention. In this embodiment, the net cage is provided with one or several vertically spaced floors or shelves 50,50 etc. The individual, internal layered floors shown are provided with one or more central openings 52, also shown, thereby providing a vertical opening or shaft through the floors down to the bottom floor 13. A net cage provided with the shown supplementary floors will be especially adapted for breeding flatfish such as flounder, i.e. so-called bottom living or seeking fish. By installing a number of supplementary mutually spaced floors as shown, the total bottom or floor area of the net cage will be multiplied, so that the net cage will have a correspondingly multiplied capacity for breeding such fishes. By providing the floor 50 with openings, the fish is free to circulate to various elevations in the cage.

I claim:

1. A plant for the storage of fish and shellfish, the plant comprising:

(a) a net cage for submerging in a body of water, the cage comprising:
 (i) a lower floor section of netting,
 (ii) cage-surrounding walls of netting, with bottom ends thereof attached to a perimeter of the floor section, and
 (iii) an upper roof section of netting with bottom ends thereof attached to top ends of the walls, the roof conforming to a frustoconical shape when in use, and the roof comprising a first buoyant body in an upper end thereof so that said first buoyant member floats on the surface of a body of water and said buoyant body supports the roof so that the roof extends slackly from the buoyant body downward to the top ends of the walls under normal operating conditions for the plant;

(b) a plurality of second buoyant bodies attached to an uppermost edge of said surrounding walls of netting at spaced intervals to support the walls vertically in a body of water;

(c) a support section comprising a third buoyant body, said support section having dimensions substantially corresponding to the floor section of the net cage and releasably attached at spaced intervals to the cage, the support section being located beneath the floor of the cage when the plant is in use; and (d) an anchoring section, comprising a plurality of cables that are substantially parallel and vertical when the plant is in use under normal conditions, a lower end of each of said cables attachable to a bottom anchor for anchoring the net cage in position and an upper end of each of the cables attached to the support section; whereby the roof of the net cage is able to move, due to slack in the net, in response to normal wave action to prevent complete submergence of the plant, but the plant will be submerged when forces are sufficiently strong to cause the normally vertical anchor cables to deviate from vertical to an angle sufficient to move the plant downwardly beyond the adjustment capability of the slack roof.

2. The plant of claim 1, wherein the support section comprises a ting-shaped buoy.

3. The plant of claim 1, wherein the third buoyant element of the support section comprises a plurality of buoys, each attached around a perimeter of the support section.

4. The plant of claim 1, wherein the first buoyant body of the upper end of the roof section provides an opening in the netting at the water surface, when the plant is in use, and a domed screen to protect the opening.

5. The plant of claim 1, wherein the net cage is releasably attached to the support section with quick couplings.

6. The plant of claim 5, further comprising hoisting lines attached to the quick couplings for releasing said couplings to remove the net cage from the support section.

7. The plant of claim 6, Wherein the quick couplings each comprise a locking pin adapted for fitting into a complementary locking bushing provided with a lock, and a hoisting line is attached to an end of the locking pin and passes through said locking bushing and thence through a block for further extension to above the surface of a body of water, when the plant is in use in a body of water.

8. The plant of claim 1, wherein the net cage further comprises additional internal substantially horizontal floors, each vertically spaced apart from each other, and each of the internal floors comprising a passage therethrough to allow fish access to each floor of the cage, when the plant is in use.

\* \* \* \* \*

UNITED STATES PATENT AND TRADEMARK OFFICE
CERTIFICATE OF CORRECTION

PATENT NO. : 5,477,813
DATED : December 26, 1995
INVENTOR(S) : E. Lien

It is certified that error appears in the above-indentified patent and that said Letters Patent is hereby corrected as shown below:

COLUMN    LINE

7             12           "ting-shaped" should read --ring-shaped--
(Claim 2,   line 2)

Signed and Sealed this

Ninth Day of April, 1996

Attest:

BRUCE LEHMAN

Attesting Officer

Commissioner of Patents and Trademarks